May 26, 1964 D. H. MOELLER 3,134,705
HONEYCOMB FABRICATION
Filed Oct. 15, 1962 2 Sheets-Sheet 1

INVENTOR.
Delmer H. Moeller
BY
Robert B. Ingpen
AGENT

May 26, 1964     D. H. MOELLER     3,134,705
HONEYCOMB FABRICATION
Filed Oct. 15, 1962     2 Sheets-Sheet 2
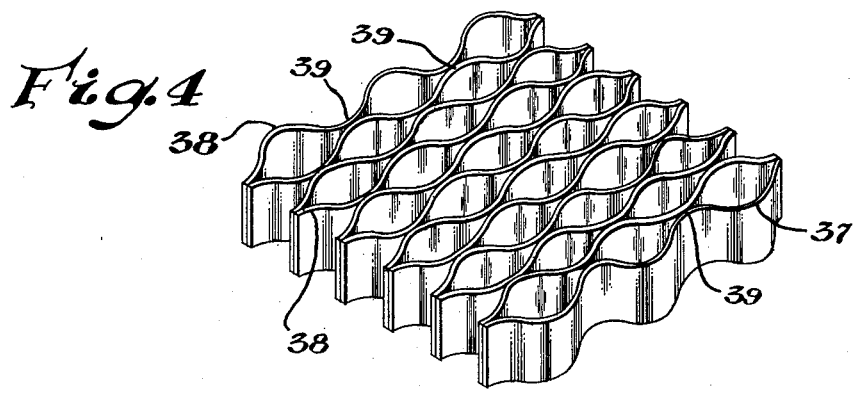
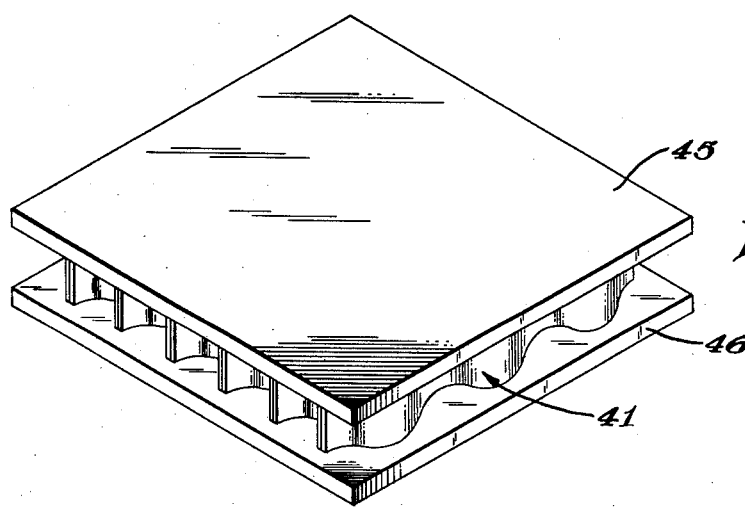
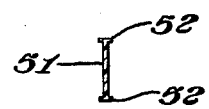
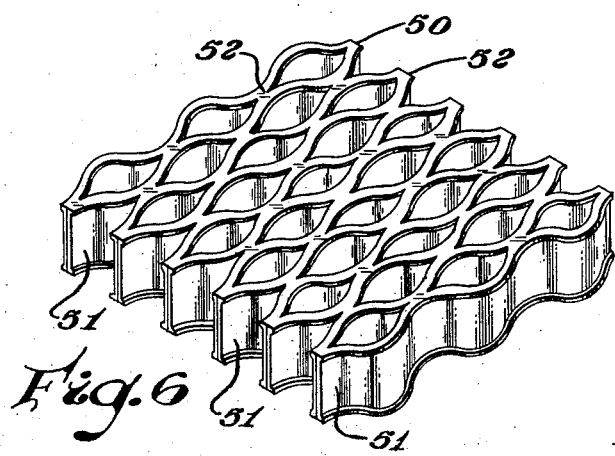
INVENTOR.
Delmer H. Moeller
BY
AGENT United States Patent Office 3,134,705
Patented May 26, 1964

3,134,705
HONEYCOMB FABRICATION
Delmer H. Moeller, Midland, Mich., assignor to The Dow Chemical Company, Midland, Mich., a corporation of Delaware
Filed Oct. 15, 1962, Ser. No. 230,569
4 Claims. (Cl. 156—197)

This invention relates to an improved method for the fabrication of structural cellular material. It more particularly relates to an improved method of preparing a rigidized expanded thermoplastic resinous honeycomb material.

It is contemplated that the present invention will have particular utility in the art of preparing cellular material generally known in the trade as honeycomb core. Also, it is known that the scope of the invention is not limited to any particular type of expanded cellular material prepared from thermoplastic resinous sheet.

For the purposes of brevity and simplicity, the present invention will be described with particular relation to honeycomb core. Various honeycomb cores have been fabricated from thermoplastic resinous material. One particularly beneficial and advantageous method of preparing a honeycomb sheet or core is to join a plurality of flat webs of thermoplastic material having alternately spaced means of attachment between the adjacent webs, expanding the flat assembly and subsequently flanging the edges of the webs by means of applying sufficient heat and pressure to cause the edges of the webs to flow and result in a generally I-shaped cross section. This method of honeycomb core fabrication is particularly advantageous in cases where the honeycomb is assembled at a central location and subsequently shipped to another location where the material is to be used. Thus, a plurality of flat sheets in close association with each other occupies considerably less space than does the finished expanded honeycomb. One of the major difficulties with the method of the known art is the problem of expanding the plurality of flat webs and maintaining the expanded honeycomb in position while flanging the edges of the webs in order to rigidize the material. Minor variations in thickness of the webs frequently result in undesired deviations of or from regular geometry within the rigidized honeycomb. Such deviations can result in undesired weak points in a finished structure when the honeycomb is utilized as a core material. Also, when such a honeycomb is used for decorative purposes, any small irregularity is readily apparent and detracts severely from the aesthetic appeal of the finished structure. In the method of preparing honeycomb known to the art from a plurality of flat webs of thermoplastic resinous material having alternately spaced means for attachment between the adjacent webs, it is necessary to maintain tension on at least the outermost edges of the webs during the flanging operation. In rigidizing relatively large quantities of this material employing a platen press by means of the method disclosed in United States Letters Patent 3,007,834, periodically locating pins become damaged and the platens oftentimes accumulate foreign substances as well as thermoplastic material from a carelessly overheated honeycomb core.

It is an object of this invention to provide an improved process for the fabrication of honeycomb core material.

It is also an object of this invention to provide a shippable unit which is improved, from which rigidized honeycomb core is readily prepared.

It is a further object of this invention to provide a method of fabricating a honeycomb core utilizing preformed corrugated webs.

It is still another object of this invention to provide a method of fabricating honeycomb core wherein adjacent webs are more readily joined together than those of the prior art.

These benefits and other advantages may be obtained in a method of forming a rigidized honeycomb structure comprising joining a plurality of webs of thermoplastic resinous material having alternately spaced means of attachment between the adjacent webs, each of said webs comprising a corrugated body of a resilient thermoplastic resinous material, said webs having a plurality of generally similar corrugations extending transversely to the major direction of the web, said adjacent webs being attached at trough to peak positions, compressing said assembled webs until they are generally in parallel relationship, subsequently releasing said webs and allowing them to regain their corrugated form, subsequently flanging or upsetting the edges of said webs while the edges are at a temperature sufficiently high to permit plastic flow and cooling said webs below said plastic flow temperature.

Other advantages and benefits of the invention will become apparent when the following description is taken in conjunction with the drawing wherein:

FIGURE 4 is an isometric representation of the webs of FIGURE 3 in expanded form;

FIGURE 5 is a schematic representation of the flanging of the webs of the honeycomb of FIGURE 4;

FIGURE 6 is a completed rigidized flanged honeycomb core; and

FIGURE 7 illustrates a cross sectional view of one of the webs of FIGURE 6.

Figure 1:
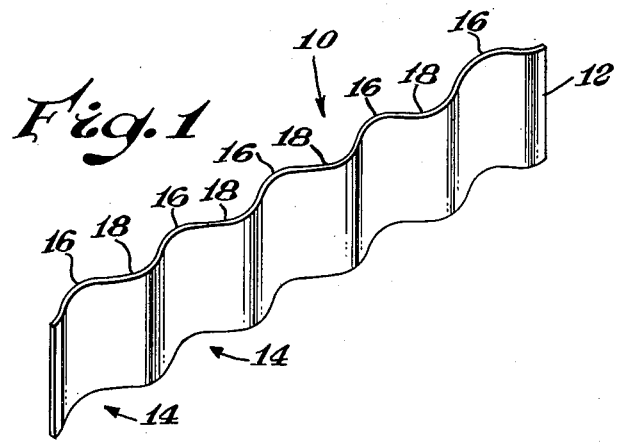
FIGURE 1 is an isometric representation of a corrugated web.

In FIGURE 1 there is illustrated an isometric view of a resilient corrugated web generally designated by the reference numeral 10. The web 10 comprises a body portion 12 and a plurality of adjacent corrugations 14. The corrugations 14 define a plurality of peaks 16 and intermediately and oppositely disposed troughs 18.

Figure 2:
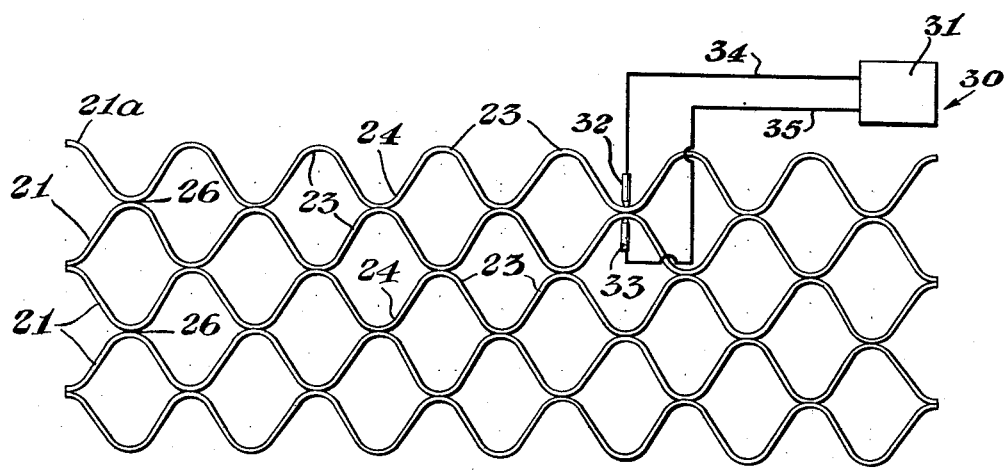
FIGURE 2 is an end view of a plurality of corrugated webs having one web being joined thereto.

FIGURE 2 depicts a honeycomb 20 comprised of a plurality of webs 21. The webs 21 are provided with a plurality of peaks 23 and troughs 24. Adjacent webs are joined together by the seals or joints 26 located at the peak to trough contact point of adjacent webs 21. A web 21a is shown partially joined to an adjacent web 21 and sealing apparatus 30 is shown in engagement with a trough 24 of the web 21a and peak 23 of the adjacent corrugated web 21.

The sealing apparatus 30 comprises a power source 31, a pair of remotely located heat sealing jaws 32 and 33 adapted to engage the webs to be joined. The jaws 32 and 33 are connected to the power source 31 by the lines 34 and 35.

Figure 3:
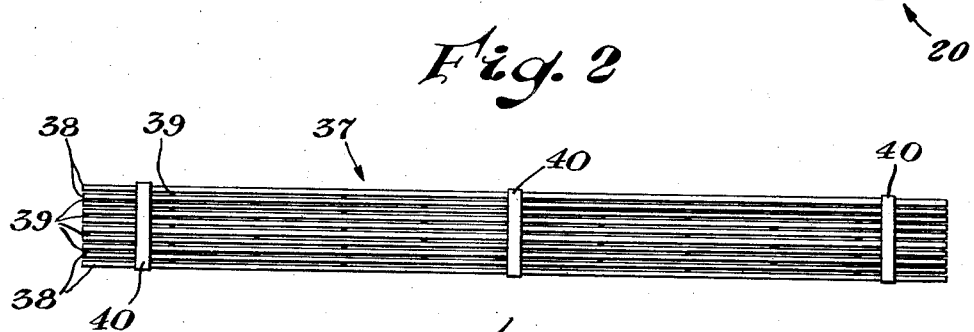
FIGURE 3 depicts an edge view of a plurality of resilient corrugated webs which are compressed.

In FIGURE 3 there is illustrated a collapsed honeycomb generally designated by the reference numeral 37. The collapsed honeycomb comprises a plurality of resilient corrugated strips 38 which are flattened to lie in substantially parallel relationship to each other and are secured to each other by means of alternately spaced means of attachment 39 between the adjacent webs 38. The honeycomb 37 is maintained in collapsed folded condition by means of the retaining means 40.

In FIGURE 4 there is illustrated an isometric view of a honeycomb 37 after the retaining bands have been removed.

In FIGURE 5 there is schematically illustrated the expanded honeycomb 41 pressed between a pair of heated platens 45 and 46.

In FIGURE 6 there is shown a view of a flanged honeycomb 50 wherein the webs 51 have been provided with a plurality of flanges 52.

In FIGURE 7 there is illustrated a cross sectional view of a web 51 having formed thereon flanges 52.

A wide variety of thermoplastic resinous materials may be employed in the practice of the invention. It is generally advantageous to form such material into sheets by calendering, extrusion or pressing and subsequently slitting or shearing the sheets into relatively narrow webs which will be employed in forming the honeycomb stack. Typical thermoplastic resinous materials which may be employed in the practice of the invention are polystyrene, polyvinyl chloride, polyethylene, polypropylene, polytetrafluoroethylene, and all other sheet-formable thermoplastic polymeric or copolymeric materials. Advantageously, conventional fillers, pigments and stabilizers may be incorporated into the sheet stock. The bonding means employed between the sheets in general will vary with the particular thermoplastic being used and, beneficially, such methods as gluing, thermal-sealing, and dielectric heating may be employed to join the web members together as well as the more conventional fastening means, such as clips, staples, screws, bolts, and the like.

Corrugated thermoplastic webs for use in the present invention are readily prepared in a wide variety of methods well known in the art. Corrugated webs may be extruded from a corrugated die, cooled and cut into a suitable length. Alternately a flat thermoplastic sheet may be heated, compression molded, and cooled in the appropriate form. This operation may be done by molds or forms which accept one web at a time or alternately a flat sheet is extruded and subsequently formed into a corrugated section by rolls or shaping fingers. In certain instances vacuum forming of a thermoplastic sheet into the corrugated web is readily accomplished.

After the honeycomb has been formed, a variety of methods may be employed to form the flanged or upset honeycomb section. Usually for most rapid and convenient production the honeycomb is formed between a pair of heated platens. The temperature of the platens must be sufficient to cause the thermoplastic resinous material in the honeycomb to flow and become permanently deformed. The platens are brought into contact with the edges of the webs and forced closer together until the desired flange width has been formed. The platens are removed and the flanged honeycomb material is cooled to a temperature below its softening point. Alternately, a single heated platen is employed if only one side of the sheet is to be upset. The sheet may also be formed from the sheet in its expanded form prior to flanging to the flanged or upset honeycomb section by applying platens smaller in total area than the area of the sheet by making a sufficient number of applications of hot platen until the entire sheet has been flanged.

It is usually advantageous to employ as a surface on the platens a material which does not adhere to the thermoplastic honeycomb at forming temperatures. Conventional mold release agents may be employed, such as waxes, siloxane derivatives, and similar antiadhesion preparations well known in the art. Alternately, the platens may be covered with sheets of nonadhesive material having a higher plastic flow temperature than the honeycomb material, such as polytetrafluoroethylene, polytetrafluoroethylene coated glass cloth and the like.

The flanged sheet is particularly advantageous when employed in core construction wherein a solid bond is required between the honeycomb core and facer sheets wherein a relatively large gluing area is provided between the core and the face sheets with a minimum weight of honeycomb stack required.

Where a honeycomb in accordance with the invention is to be shipped, the assembly may be readily compressed by the application of force to the outermost corrugated webs and formed into a bundle of substantially flat webs as shown in FIGURE 3, whereupon banding or other restraining means is applied to the bundle prior to shipping. Often it is advantageous to pack honeycombs of the invention in a carton wherein a plurality of the collapsed honeycombs are placed in side by side relationship and the walls of the carton serve to restrain the flattened bundles of webs or honeycombs until they are to be used. Release of the compression force such as the bands 40 or removal from a shipping carton permits the collapsed honeycomb to expand into its desired form. A great benefit and advantage is achieved by use of the invention wherein shipping of the product is required. Fabrication of the honeycomb stack requires relatively large, expensive, and bulky equipment, whereas the equipment required for the flanging operation is relatively small and simple. Subsequently, the honeycomb stack may be prepared in large quantities and shipped in collapsed form to the point where it is to be used and formed into the rigidized expanded honeycomb material by employing a relatively simple, inexpensive, lightweight hot platen press or similar portable flanging means including an electric iron.

As is apparent, the method is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. A method of forming a honeycomb structure comprising joining a plurality of corrugated webs of thermoplastic resinous material having alternately spaced means of attachment between the adjacent webs, each of said webs comprising a corrugated body of a resilient thermoplastic resinous material, said webs having a plurality of generally similar corrugations extending transversely to the major direction of the web, said adjacent webs being attached at trough to peak positions, compressing said assembled webs until they are generally in parallel relationship, subsequently releasing said webs and allowing them to regain their corrugated form, subsequently flanging or upsetting the edges of said webs while the edges are at a temperature sufficiently high to permit plastic flow and cooling said webs below said plastic flow temperature.

2. The method of claim 1, wherein said thermoplastic resinous material is polystyrene.

3. The method of claim 1, wherein said expanded honeycomb structures are flanged from both edges of said webs.

4. The method of claim 1, wherein said adjacent webs are heat sealed together.

References Cited in the file of this patent

UNITED STATES PATENTS

| | | |
|---|---|---|
| 2,549,802 | George et al. | Apr. 24, 1951 |
| 2,674,295 | Steele et al. | Apr. 6, 1954 |
| 3,007,834 | Moeller et al. | Nov. 7, 1961 |